United States Patent
Wang et al.

(10) Patent No.: US 9,574,431 B2
(45) Date of Patent: *Feb. 21, 2017

(54) CAVITATION-BASED HYDRO-FRACTURING TECHNIQUE FOR GEOTHERMAL RESERVOIR STIMULATION

(71) Applicant: UT-Battelle, LLC, Oak Ridge, TN (US)

(72) Inventors: Jy-An John Wang, Oak Ridge, TN (US); Hong Wang, Oak Ridge, TN (US); Fei Ren, Philadelphia, PA (US); Thomas S. Cox, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 541 days.

This patent is subject to a terminal disclaimer.

(21) Appl. No.: 14/224,367

(22) Filed: Mar. 25, 2014

(65) Prior Publication Data

US 2015/0275638 A1    Oct. 1, 2015

(51) Int. Cl.
| | |
|---|---|
| *E21B 43/26* | (2006.01) |
| *E21B 28/00* | (2006.01) |
| *F24J 3/08* | (2006.01) |
| *F03G 7/04* | (2006.01) |

(52) U.S. Cl.
CPC ............... *E21B 43/26* (2013.01); *E21B 28/00* (2013.01); *F03G 7/04* (2013.01); *F24J 3/085* (2013.01); *F24J 2003/088* (2013.01); *Y02E 10/14* (2013.01)

(58) Field of Classification Search
CPC ............ E21B 43/26; E21B 28/00; E21B 7/24; E21B 21/103; F24J 3/085; F24J 2003/088; Y02E 10/14; F03G 7/04
See application file for complete search history.

(56) References Cited

U.S. PATENT DOCUMENTS

| | | | |
|---|---|---|---|
| 4,787,446 A | 11/1988 | Howell et al. | |
| 6,419,022 B1 | 7/2002 | Jernigan et al. | |
| 7,921,876 B2 | 4/2011 | Wright et al. | |
| 2004/0156265 A1* | 8/2004 | Lavrut | E21B 47/18 367/83 |
| 2009/0071658 A1 | 3/2009 | Reid et al. | |
| 2011/0056695 A1 | 3/2011 | Downton | |
| 2011/0232917 A1 | 9/2011 | Skinner et al. | |
| 2012/0043092 A1 | 2/2012 | Arizmendi, Jr. et al. | |

(Continued)

OTHER PUBLICATIONS

D. Pixton and D. Hall, "Advanced Mud Hammer System,".

*Primary Examiner* — Robert E Fuller
*Assistant Examiner* — Christopher Sebesta
(74) *Attorney, Agent, or Firm* — Colin L. Cini

(57) ABSTRACT

A rotary shutter valve 500 is used for geothermal reservoir stimulation. The valve 500 includes a pressure chamber 520 for holding a working fluid (F) under pressure. A rotatable shutter 532 is turned with a powering device 544 to periodically align one or more windows 534 with one or more apertures 526 in a bulkhead 524. When aligned, the pressurized working fluid (F) flows through the bulkhead 524 and enters a pulse cavity 522, where it is discharged from the pulse cavity 522 as pressure waves 200. The pressure wave propagation 200 and eventual collapse of the bubbles 202 can be transmitted to a target rock surface 204 either in the form of a shock wave 206, or by micro jets 208, depending on the bubble-surface distance. Once cavitation at the rock face begins, fractures are initiated in the rock to create a network of micro-fissures for enhanced heat transfer.

16 Claims, 7 Drawing Sheets

(56) References Cited

U.S. PATENT DOCUMENTS

2012/0103595 A1    5/2012  Hall et al.
2012/0193145 A1*  8/2012  Anderson ................ E21B 7/24
                                                175/56

* cited by examiner

CAVITATION-BASED HYDRO-FRACTURING TECHNIQUE FOR GEOTHERMAL RESERVOIR STIMULATION

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

CROSS-REFERENCE TO RELATED APPLICATIONS

This patent application is related to U.S. application Ser. No. 14/224,414 filed on Mar. 25, 2014 and entitled, A CAVITATION-BASED HYDRO-FRACTURING SIMULATOR, now U.S. Pat. NO. 9,500,068, the entire contents of which are included herein by reference as if included at length.

THE NAMES OF THE PARTIES TO A JOINT RESEARCH AGREEMENT

None.

BACKGROUND OF THE INVENTION

1. Field of the Invention

The present disclosure relates to geothermal energy production and particularly to apparatuses and methods for supporting Enhanced Geothermal Systems (EGS).

2. Description of the Related Art

Geothermal energy is an important part of the nation's renewable energy initiative. FIG. 1 illustrates a simplified schematic of a geothermal plant that generates electricity for the electrical grid. A working fluid (F) such as water is transferred with a pump 100 down into the hot rock formations through an injection well 102, where it absorbs heat energy from the fractured rock formation. The heated working fluid (F) is then pumped to an energy conversion plant 104 through a production well 106. Depending on the fluid's (F) temperature, it may directly be used to power a turbine or may be used to heat a secondary working fluid, which, in turn, is used to power a turbine. The turbine is coupled to a generator through a common shaft (not shown), to generate electricity for the electrical grid 108. The cooled working fluid (F) is then injected with the pump 100 back into the hot rock geothermal reservoir through the injection well 102 to sustain the process. Geothermal energy generation is considered a green technology, because little or no greenhouse gases are emitted into the atmosphere and the energy source is renewable.

An Enhanced Geothermal System (EGS) is a man-made reservoir, created where there is sufficient underground hot rock but insufficient or little natural permeability or working fluid saturation in the rock. EGS expands the geothermal energy domain into much deeper rock deposits by exploiting natural and artificial fracture systems/networks within rock mass. Maintaining and/or creating such facture networks in complicated geological environments are critical to the successful development and long-term sustainability of the EGS. The EGS targets a huge energy source that amounts to 500 GWe in the western U.S. and 16,000 GWe in the entire U.S. Several demonstration projects are undergoing in the U.S. to validate different reservoir stimulation techniques. The ultimate reservoir will have a flow rate of 60 kg/s, a lifetime of 30 years along the drilling systems down to 10,000 meters deep at 374 Degrees Celsius.

EGS reservoir stimulation technologies currently are adapted from the oil and natural gas industry including various hydrofracking methods with or without chemical additives. A potential drawback of using hydrofracking techniques is the lack of effective control in the creation of large fractures, which could result in by-pass of targeted fracture network or even fault movement in the rock formation. The loss of hydraulic medium can reduce heat exchange efficiency and increase the cost of the development of EGS. The use of chemicals along with the unpredictable fault movement may also adversely impact the environment.

Cavitation is the process of the formation of vapors, voids, or bubbles due to pressure changes in a liquid flow as schematically illustrated in FIG. 2. The pressure wave propagation 200, and eventual collapse of the bubbles 202 can cause local pressure changes in the liquid, which can be transmitted to a target rock surface 204 either in the form of a shock wave 206, or by micro jets 208, depending on the bubble to surface distance. Pressure greater than 100,000 psi has been measured in a shock wave 206 resonating from cavitating bubbles 202. It is generally understood that the cycle of formation and collapse of the bubbles that occurs, often at a high frequency, can generate dynamic stress on the surfaces of objects. Ultimately, the dynamic stress can contribute to the fatigue of the target surface, including micro-cracks that form and coalesce on the surface 204, eventually leading to material removal known as cavitation damage.

What are needed are apparatuses and methods for generating a pulse-pressure cavitation technique (PPCT) for use in Enhanced Geothermal Systems (EGS) and oil and gas wells.

BRIEF SUMMARY OF THE INVENTION

Disclosed are several examples of cavitation-based hydro-fracturing apparatuses and methods. A brief description is provided immediately below and a more detailed description follows.

According to one example, an apparatus includes an outer housing having an upstream end defining both an inlet aperture and a pressure chamber. The pressure chamber accepts a pressurized working fluid via the inlet aperture. A downstream end of the housing defines a pulse cavity for discharging the pressurized working fluid, and a medial portion of the housing defines a stationary bulkhead disposed between the pressure chamber and the pulse cavity. The bulkhead defines one or more bulkhead apertures that fluidly couple the pressure chamber to the pulse cavity. A rotatable shutter is disposed inside the pressure chamber and adjacent to the bulkhead. The shutter defines one or more windows and is affixed to a shaft extending through the pressure chamber and supported by the bulkhead. The shaft exits the outer housing through its upstream end. A powering device is affixed to the shaft at its upstream end, and the rotation of the shaft by the powering device causes the windows in the shutter to alternately block and unblock the one or more bulkhead apertures. This causes the pressurized working fluid in the pressure chamber to flow through the apertures in the bulkhead, into the pulse cavity, and out of the downstream end of the housing as pressure pulses.

According to another example, a method includes: lowering an apparatus as described above into a well casing;

pressurizing the pressure chamber with the working fluid using a pump connected to the inlet aperture via a conduit; rotating the shutter with the powering device; discharging the working fluid from the pulse cavity; generating a pressure fluctuation near the liquid and rock interface with the working fluid to induce cavitation on the rock surface; and fracturing the rock to create a network of micro-fissures for increased permeability and enhanced heat transfer.

BRIEF DESCRIPTION OF THE SEVERAL VIEWS OF THE DRAWINGS

The apparatus and method may be better understood with reference to the following non-limiting and non-exhaustive drawings and description. The components in the figures are not necessarily to scale, emphasis instead being placed upon illustrating principles. In the figures, like referenced numerals may refer to like parts throughout the different figures unless otherwise specified.

DETAILED DESCRIPTION OF THE INVENTION

Cavitation can be created by generating pressure fluctuation at the liquid/solid interface. In addition to the liquid phase changes in EGS, bubbles will form when the liquid pressure in the flow fluctuates below the cavitation threshold pressure. Cavitation induced localized shock waves and micro jets can effectively generate surface pitting. The repetitive cavitation events due to collapse of large cluster of bubbles can further induce more intense shock waves to fatigue the hot rock surfaces and develop extensive surface crack networks, in addition to the progressively increased crack depth. Cavitating intensity can be controlled by changing the magnitude of the pressure variation as well as the frequency. Such a fracturing process is much less intrusive than the conventional techniques to the integrity of the rock formation, thus it will extend the lifetime of EGS reservoirs and reduce the potential of fault movement induced earth instability. Furthermore, it has the benefit of creating widely distributed fractures in EGS reservoirs to enhance its heat-exchange efficiency. Oil and gas wells will also benefit from the increased permeability provided by the pulse-pressure cavitation technique (PPCT).

Figure 1:
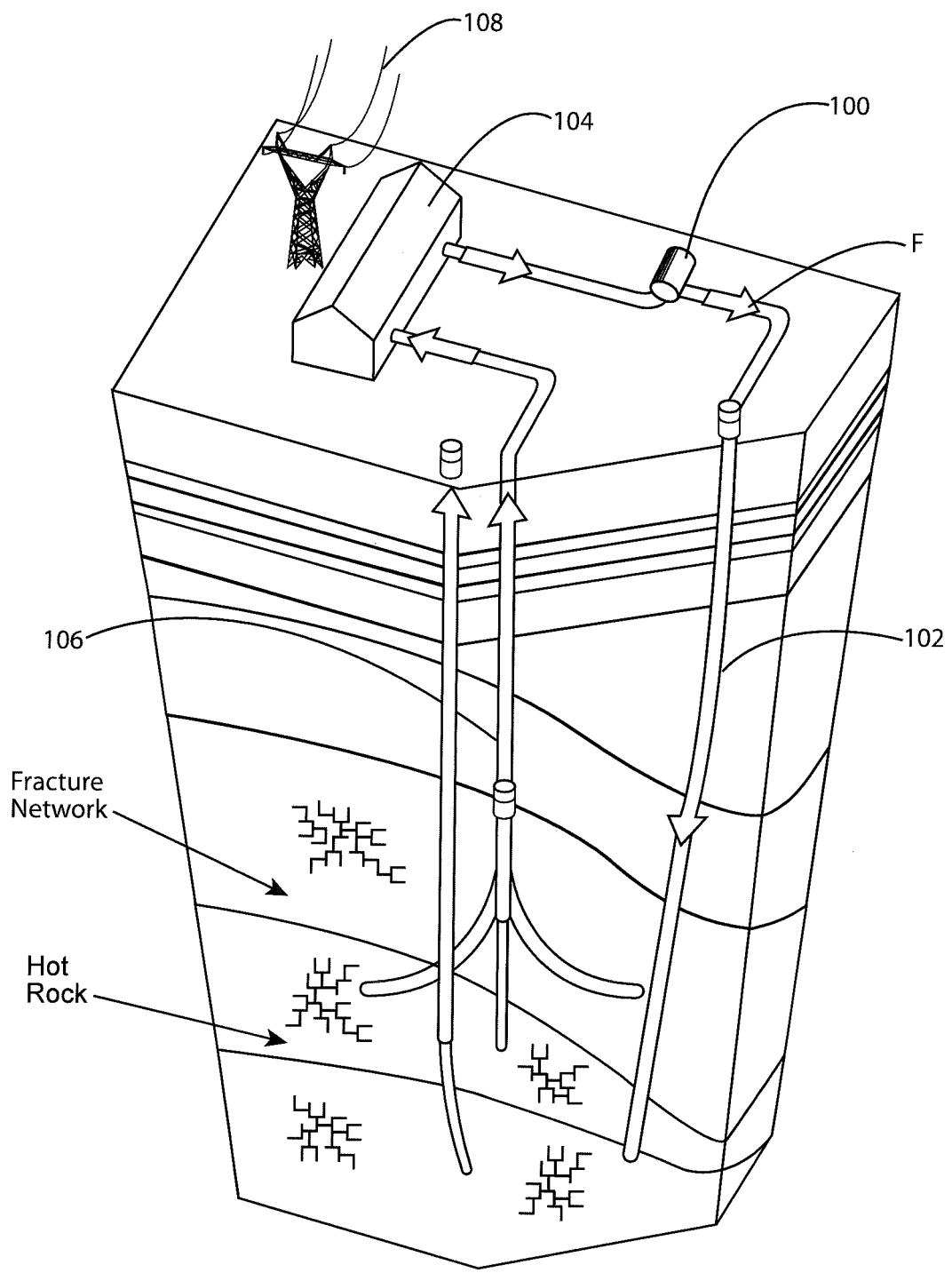
FIG. 1 is a simplified sectional schematic of a geothermal energy conversion plant.
Figure 2:
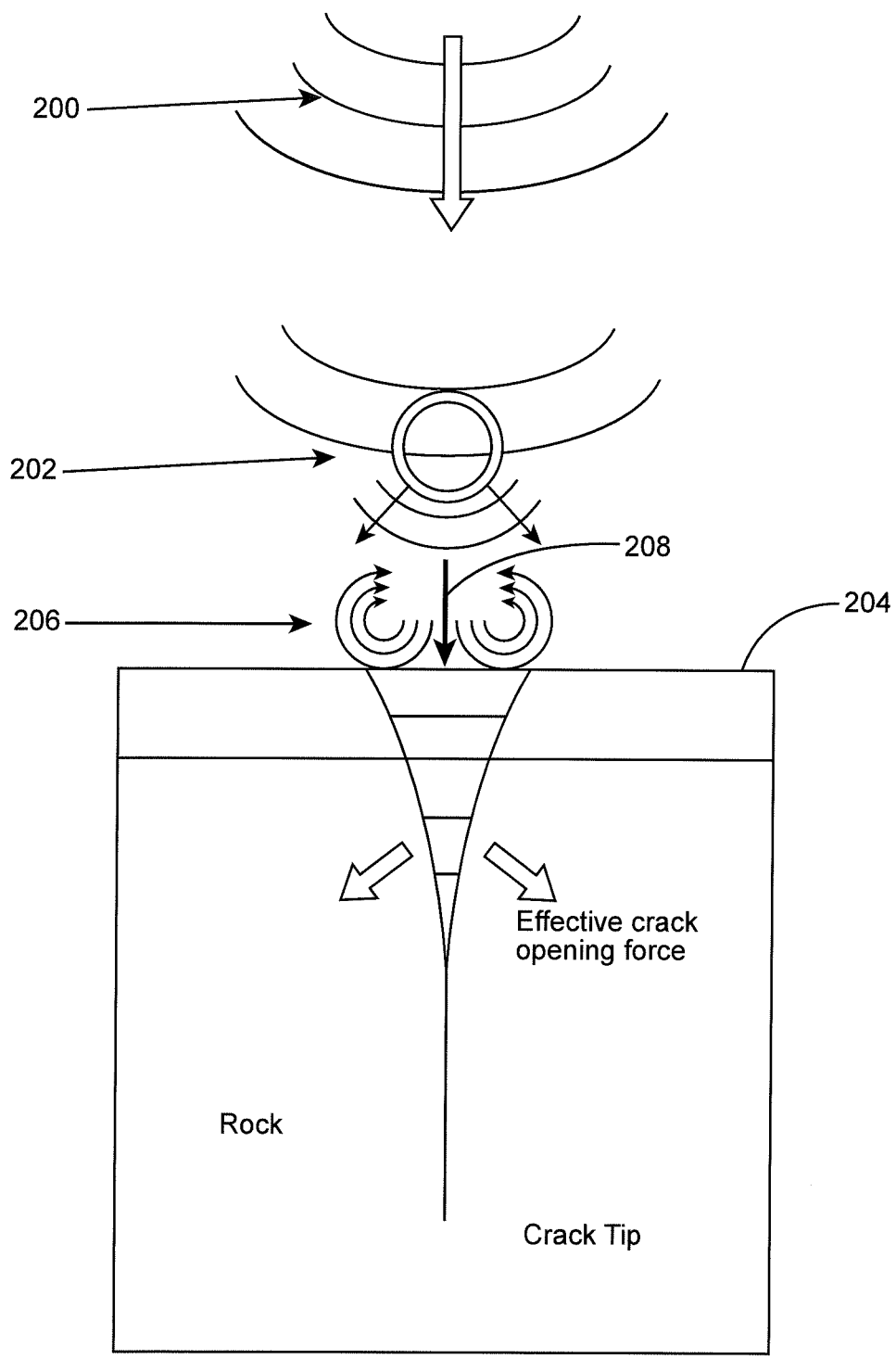
FIG. 2 is a simplified rendition of cavitation mechanics at a fluid and surface interface.
Figure 3:
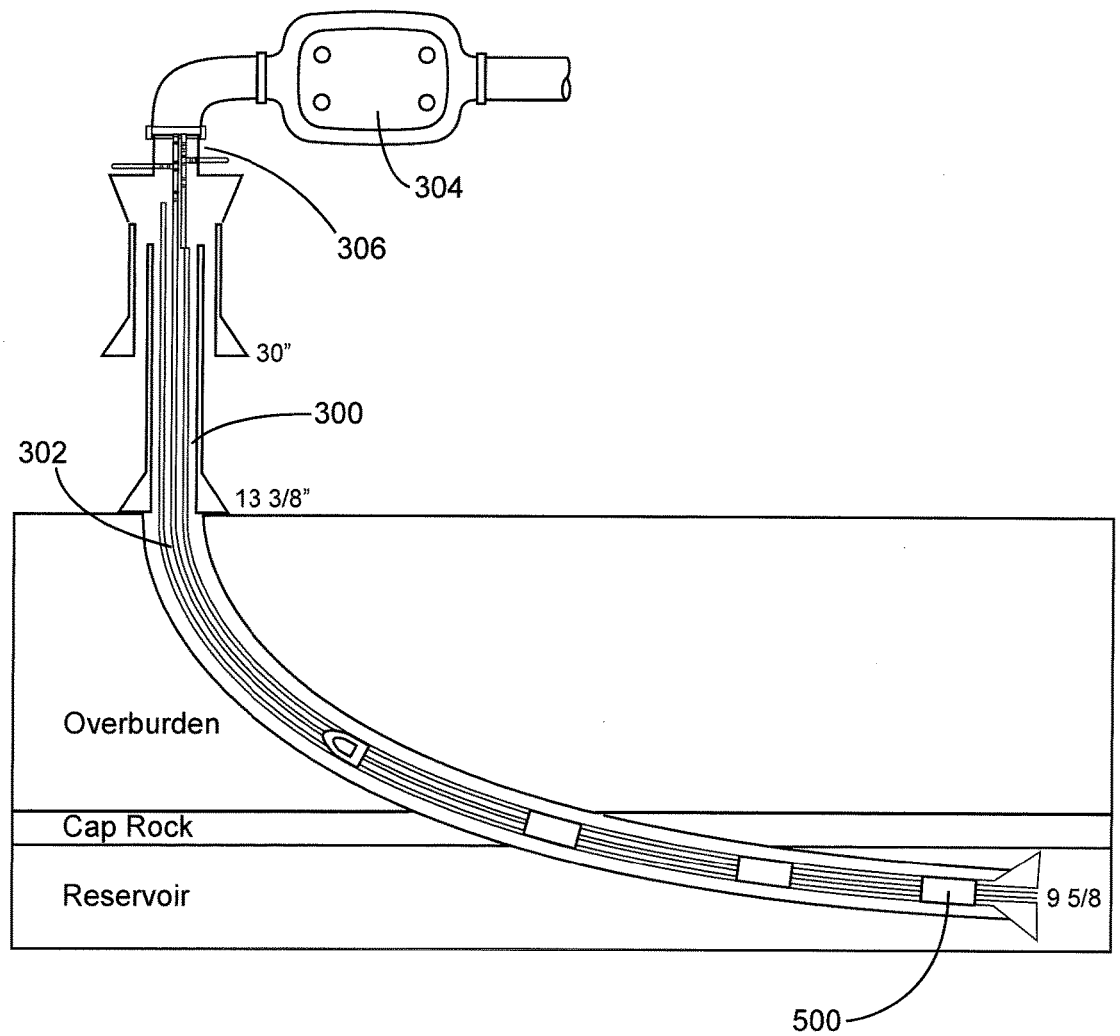
FIG. 3 is a cross sectional detailed illustration of a geothermal reservoir and an enhancement well.

With reference now to FIG. 3, an Enhanced Geothermal System (EGS) well casing 300 extends downward from the surface, through an overburden layer, a cap rock layer, and into a geothermal reservoir. Metal and cement casings 300 are well known in the art and the well casing material must perform in high temperature, corrosive, and erosive environments of a geothermal reservoir. Steel and cement materials are typically used for geothermal, gas and oil well casings.

A flexible conduit 302 extends between a surface pump 304 located adjacent to the well head 306 and a remotely-located rotary shutter valve 500. Note that the surface pump 304 is different from the geothermal system pump 100 described earlier. The conduit 302 is made from a pipeline steel material, which is strong yet flexible to enable the rotary shutter valve 500 to traverse the length of the casing 300, which may have a linear and/or nonlinear path. The conduit 302 internally carries a working fluid (F) such as water or a hydraulic fracking fluid and is also used to position the rotary shutter valve 500 within the reservoir as shown. The surface pump 304 may be a positive displacement pump that provides a working fluid (F) pressure less than or equal to approximately 300 psi (2068.4 kPa), greater than or equal to approximately 300 psi (2068.4 kPa), or greater than or equal to approximately 300 psi (2068.4 kPa) and less than or equal to approximately 2,000 psi (13789.5 kPa). The surface pump 304 maintains a near constant pressure in the conduit 302, while the rotary shutter valve 500 generates the cavitation effect inside the reservoir.

Figure 4:
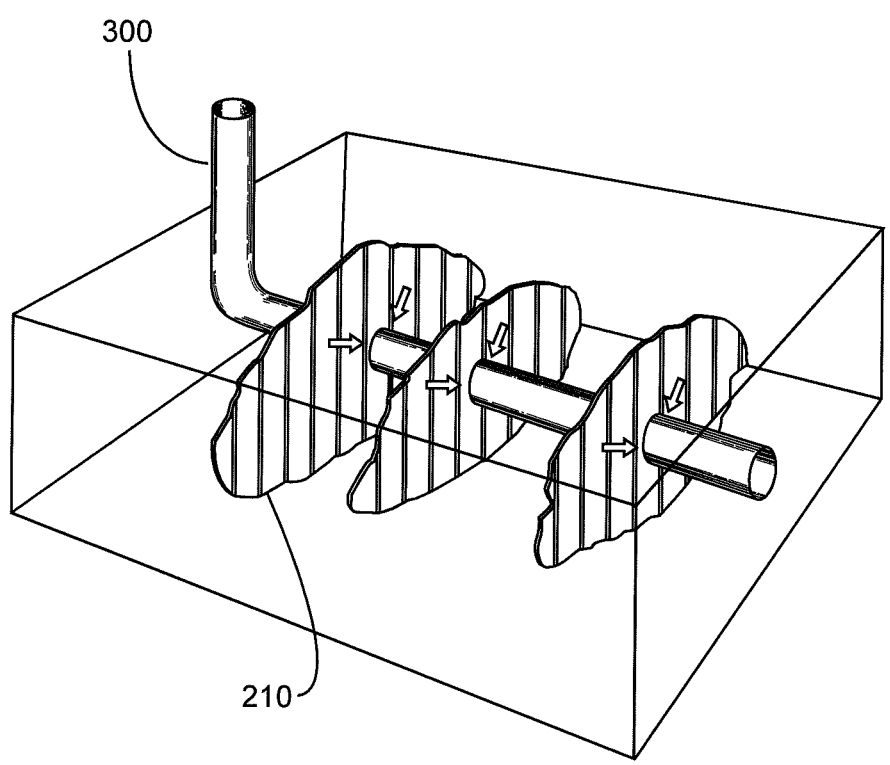
FIG. 4 is a schematic illustration of crack initiation sites in the reservoir of FIG. 3.

As shown in FIG. 4, the rotary shutter valve 500 generates fractures and micro-cracks 210 in the reservoir rocks at different locations along the length of the reservoir by using the pulsed pressure cavitation technique (PPCT). Rock bridges between existing fractures are cracked to form an interconnected fracture network for increased permeability and improved heat transfer. The effect of the cavitation and solid/fluid interaction can effectively generate an extensive network of fracturing surfaces and micro-fissures in a much more controllable manner than conventional fracking technologies. To reach the high efficiency of heat transfer, more fracture surface areas, and not volume, is necessary. This is difficult to achieve by conventional high-intrusive, high-pressure injection fracture approaches. Additionally, mud and silt buildup in the crack network can be flushed away from the fracture network to regenerate existing reservoirs and extend their functional lives.

Figure 5:
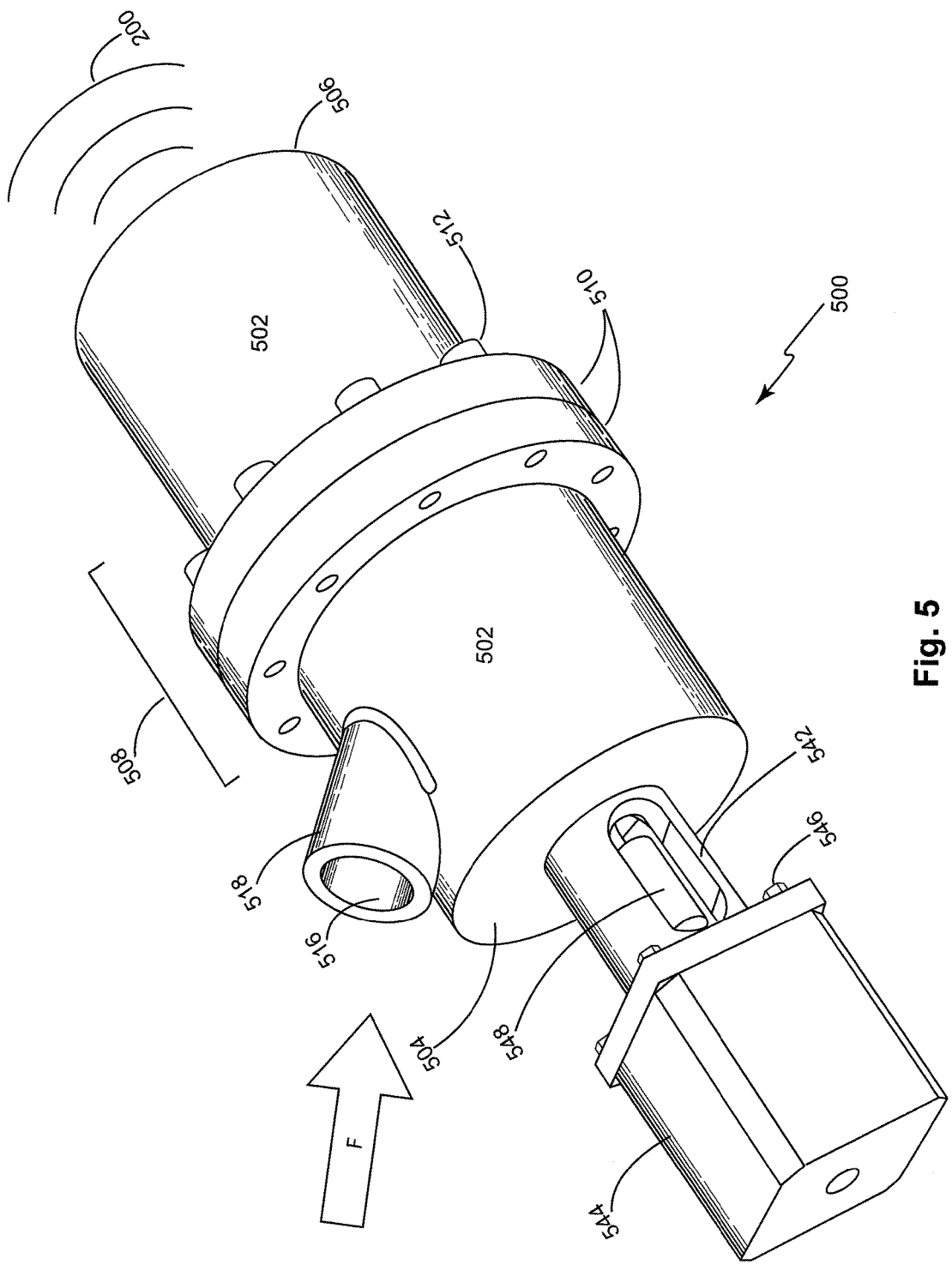
FIG. 5 is an external view of an exemplary rotary shutter valve.
Figure 6:
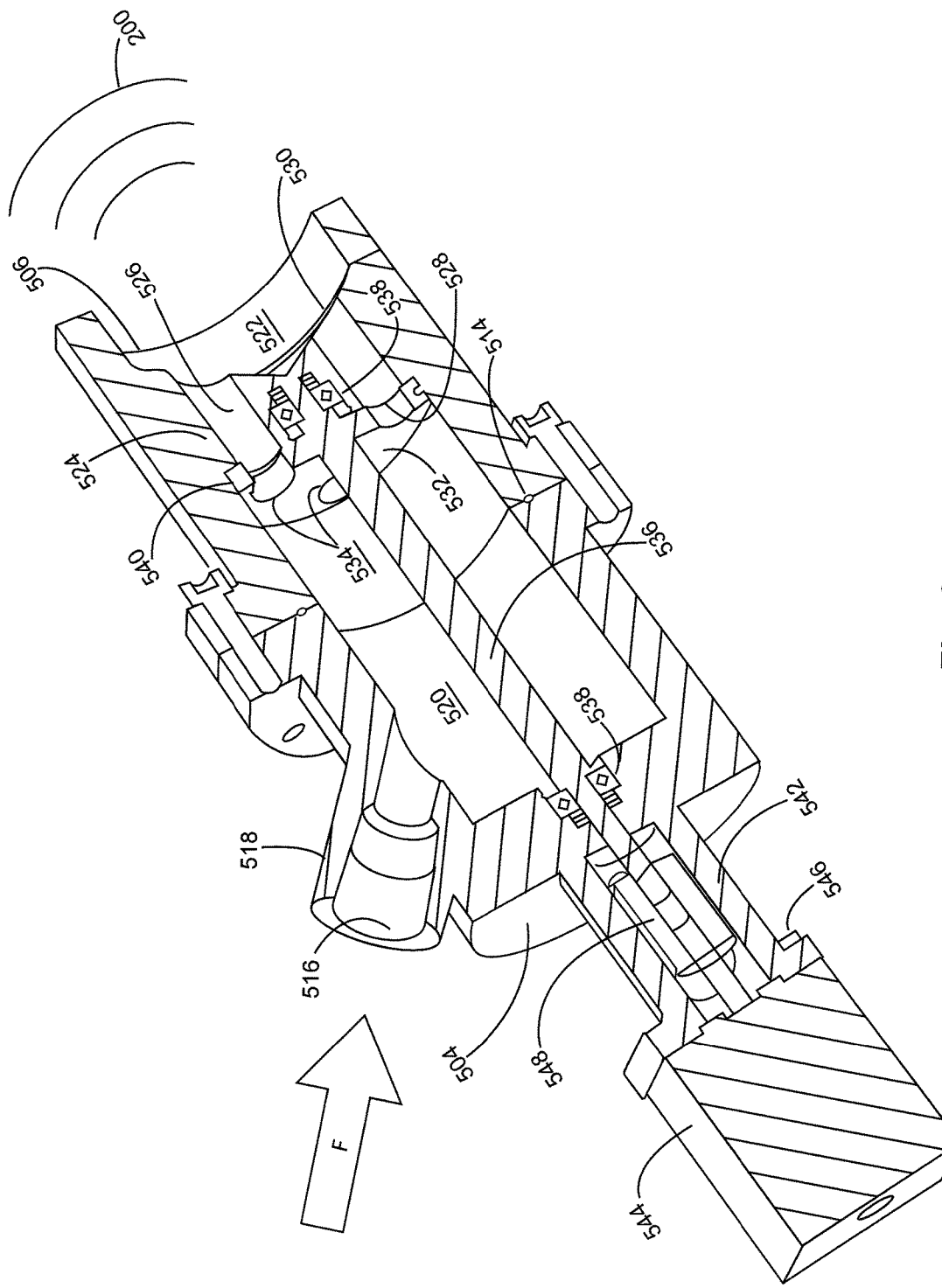
FIG. 6 is a cross sectional view of the exemplary rotary shutter valve of FIG. 5.
Figure 7:
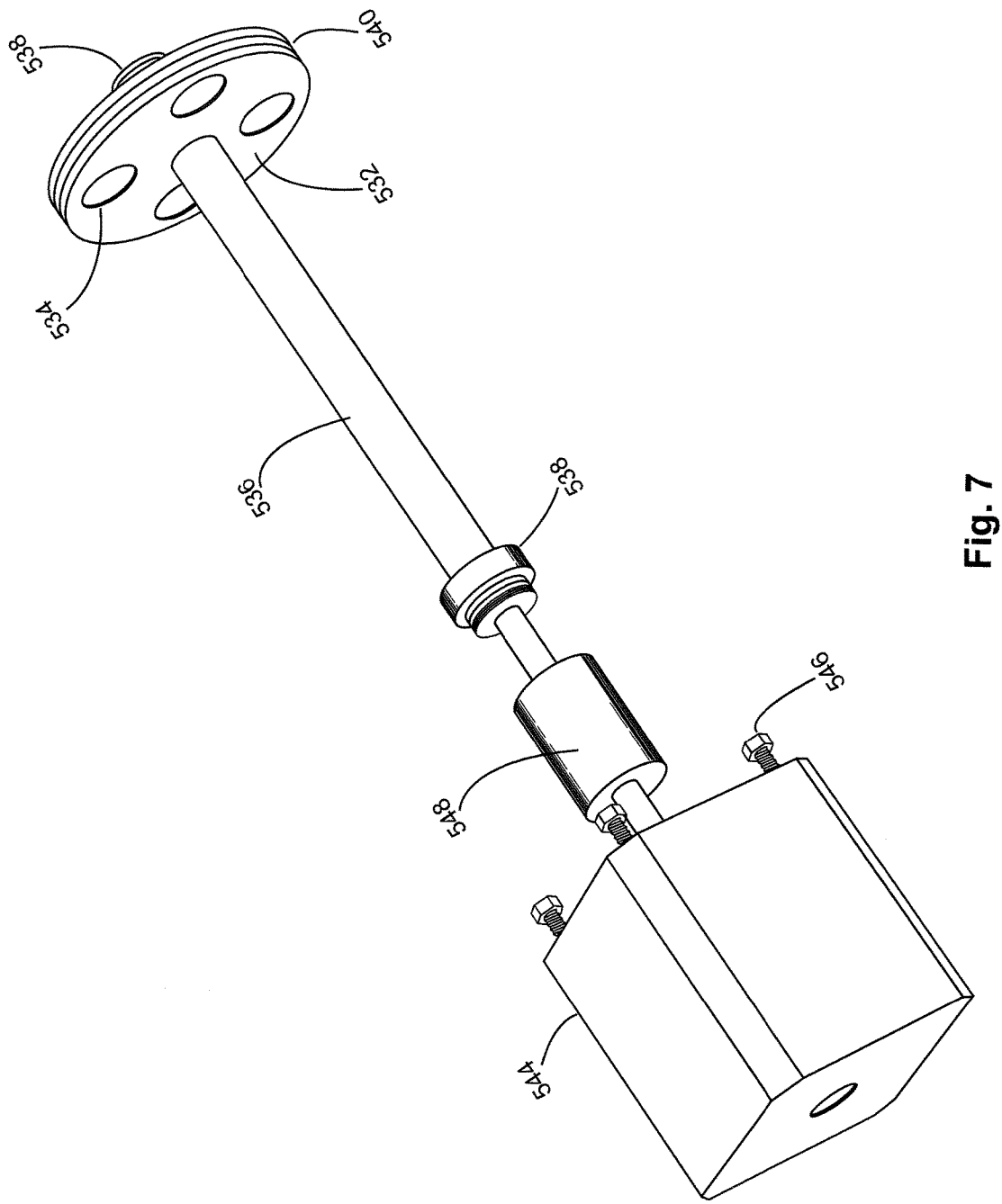
FIG. 7 is a view of the internal, rotational elements of the exemplary rotary shutter valve of FIG. 5.

Referring to FIGS. 5-7, an exemplary rotary shutter valve 500 will now be described in greater detail. An outer housing 502 includes an upstream end 504, an opposite downstream end 506, and a medial portion 508 disposed between the two ends. The outer housing 502 is preferably made from two cylindrical-shaped segments that are joined together at a circumferential flange 510 to simplify assembly, cleaning, inspection, modification, and repair of the assembly. The flange 510 is held together with a plurality of circumferentially spaced fasteners 512 such as rivets, clamps or threaded fasteners as shown. An O-ring type seal 514 engages a corresponding gland machined into one or both of the two segments as illustrated in FIG. 6. The outer housing 502 is machined from a high strength, high temperature, and corrosion resistant material such as stainless steel. SAE 304 or 316 stainless steels perform well in this application.

An inlet aperture 516 is defined by the outer housing 502 at its upstream end 504. An integral boss 518 provides additional material for connecting a conduit 302 using fittings known in the art (not shown). The inlet aperture 516 fluidly couples a pressure chamber 520, which is also defined by the outer housing 502 at its upstream end 504. The term fluidly couples means that working fluid (F) is able to flow between or through one or more components. The working fluid (F) flows under pressure from the conduit 302, though the inlet aperture 516, and into the pressure chamber 520. The downstream end 506 of the outer housing 502 defines a pulse cavity 522, which discharges the pressurized working fluid (F) from the rotary shutter valve 500 as a series of pressure pulses 200 into the reservoir.

The medial portion 508 of the outer housing 502 defines a bulkhead 524, which separates the pressure chamber 520 from the pulse cavity 522. The bulkhead 524 is preferably integral with the outer housing 502, but it may also be a separate component that is joined to the outer housing 502 by threads or other mechanical means such as welding. The bulkhead 524 defines one or more bulkhead apertures 526, which fluidly couple the pressure chamber 520 with the pulse cavity 522. In the example shown, two, equally spaced, circular bulkhead apertures 526 are used. In other examples, more or less apertures 526 of circular or other shapes are used. Also, apertures 526 with constant (shown), converging, or diverging cross sections from their upstream to downstream openings are contemplated. The upstream surface 528 of the bulkhead 524 is planar shaped and the downstream surface 530 is concave conical shaped in the example. The concave conical shape of the downstream surface helps direct the pressure waves 200. Other shapes (e.g., concave spherical, concave parabolic) are contemplated for the bulkhead downstream surface 530 as well.

A rotatable shutter 532 is disposed inside of the pressure chamber 520 and adjacent to the upstream surface 528 of the bulkhead 524. The shutter 532 defines one or more windows 534 that generally conform in size, shape, and radial placement with the bulkhead apertures 526. In the example shown in the Figures, four, equally spaced, circular windows 534 are used. In other examples, more or less windows 534 of circular or other shapes and sizes are used. The shutter 532 is affixed to, or integral with, a shaft 536 that extends through the pressure chamber 520 and exits the outer housing 502 at its upstream end 504.

Thrust bearings 538 support the shaft 536 and press-fit into pockets machined in the bulkhead 524 and the upstream end 504 of the outer housing. Shoulders on the shaft 536 contact the thrust bearings 538 to prevent the shaft 536 from moving axially, thus preventing the shutter 532 from contacting the bulkhead 524, seizing, galling, and/or causing destructive vibrations while rotating. An O-ring type seal 540 engages a corresponding gland machined into the radially outer surface of the shutter 532 and prevents leakage of the working fluid (F) from occurring at the gap between the shutter 532 and the outer housing 502. A material such as polyurethane, aluminum, graphite or other strong, high temperature capable material may be used for the O-ring seal 540.

Extending outward from the upstream end 504 of the outer housing 502 is a mounting pad or flange 542 for accepting a powering device 544. The powering device 544 is affixed to the mounting flange 542 with one or more fasteners 546 such as rivets, bolts or screws. In the example shown, an electric motor is used as the powering device 544, but a hydraulic motor, a pneumatic motor, or other such device would also work in this application. Electricity, air, or hydraulic fluid is supplied to the powering device 544 through wires or hoses respectively (not shown).

A coupling 548 connects the powering device 544 to the shaft 536. The coupling 548 may include threads, set screws, shear pins, keys, collets, and/or other connecting means. In order to protect the powering device 544 from damage, the coupling 548 is designed to fail if the shutter 532 and/or shaft 536 break, seize, or become otherwise jammed in the pressure chamber 520 for some reason.

During operation of the rotary shutter valve 500, the powering device 544 transfers rotation to the shaft 536 through the coupling 548. The spinning shaft 536 rotates the shutter 532, causing the windows 534 to alternately align with (unblock) and misalign with (block) the one or more bulkhead apertures 526. The pressurized working fluid (F) in the pressure chamber 520 discontinuously flows through the apertures 526, into the pulse cavity 522, and out of the downstream end 506 of the rotary shutter valve 500 as pressure pulses 200. The pressure pulses cause cavitation to occur near the face of the rock and, in turn, introduce fractures and micro cracks for increased permeability and improved heat transfer. It is noted that the working fluid pulses are controlled by the number and size of the bulkhead apertures 526, the number of shutter windows 534, the rotational speed of the shutter 532, and the pressure of the working fluid (F).

A method for stimulating the hydrofracturing rock in a geothermal reservoir will now be described in greater detail. First, a rotary shutter valve 500 is lowered down a well casing 300 and into a geothermal reservoir by an attached conduit 302. The conduit 302 extends between the rotary shutter valve 500 and a surface-mounted pump 304 and a power source for the powering device 544. In some examples, the power source is electricity supplied by wires and, in other examples, the power source is pressurized hydraulic fluid supplied by hydraulic hoses. Once positioned at the correct location in the reservoir, the pressure chamber 520 is pressurized with the working fluid (F) by the pump 304 to a pressure less than or equal to approximately 300 psi (2068.4 kPa), greater than or equal to approximately 300 psi (2068.4 kPa), or greater than or equal to approximately 300 psi (2068.4 kPa) and less than or equal to approximately 2,000 psi (13789.5 kPa). Once up to operating pressure, the shutter 532 is rotated with the powering device 544 and the pressurized working fluid (F) is conveyed through the bulkhead apertures 526 and into the pulse cavity 522. The shutter 532 can rotate up to approximately 300 revolutions per minute, greater than approximately 300 revolutions per minute, or between approximately 300 revolutions per minute and approximately 60,000 revolutions per minute. The working fluid (F) is then discharged from the pulse cavity 522 as a pressure wave 200 that forms a bubble 202 that collapses as it approaches the rock surface 204. The rock is hit with a shock wave 206 or micro-jets 208, depending on the bubble to surface distance. Once cavitation at the rock face begins, fractures 210 are initiated in the rock surface 204 to create a network of micro-fissures for enhanced heat transfer.

While this disclosure describes and enables several examples of geothermal reservoir stimulation, other examples and applications are contemplated. Accordingly, the invention is intended to embrace those alternatives, modifications, equivalents, and variations as fall within the broad scope of the appended claims. The technology disclosed and claimed herein may be available for licensing in specific fields of use by the assignee of record.

What is claimed is:

1. An apparatus for generating a pulsed pressure induced cavitation effect from a pressurized working fluid to stimulate hydrofracturing of rock in a geothermal reservoir, the apparatus comprising:

an outer housing having a upstream end defining both an inlet aperture and a pressure chamber, the pressure chamber accepting the pressurized working fluid via the inlet aperture, and a downstream end defining a pulse cavity for discharging the pressurized working fluid, and a medial portion defining a stationary bulkhead disposed between the pressure chamber and the pulse cavity and defining one or more bulkhead apertures that fluidly couple the pressure chamber to the pulse cavity;

a rotatable shutter that is disposed inside the pressure chamber and adjacent to the bulkhead, the shutter defining one or more windows and being affixed to a shaft, supported by the bulkhead, and extending through the pressure chamber, the shaft exiting the outer housing through its upstream end;

a powering device coupled to the shaft at its upstream end; and wherein the rotation of the shaft by the powering device causes the windows in the shutter to alternately align and misalign with the one or more bulkhead apertures, causing the pressurized working fluid in the pressure chamber to flow through the apertures in the bulkhead, into the pulse cavity, and out of the downstream end of the housing as pressure pulses.

2. The apparatus of claim 1 wherein the downstream end of the bulkhead defines a concave, conical-shaped surface.

3. The apparatus of claim 1 wherein the powering device is an electric motor.

4. The apparatus of claim 1 wherein the outer housing comprises a upstream segment and a downstream segment that are joined together at a flange around the pressure chamber.

5. The apparatus of claim 1 and further comprising a positive displacement pump connected to the inlet aperture via a conduit.

6. The apparatus of claim 5 further comprising a working fluid and wherein the working fluid is water.

7. The apparatus of claim 6 wherein the pressure of the working fluid in the pressure chamber is greater than or equal to approximately 300 psi (2068.4 kPa) and less than or equal to approximately 2,000 psi (13789.5 kPa).

8. The apparatus of claim 7 wherein the period between pulses of the pressurized working fluid is determined by the number of shutter windows, the number of bulkhead apertures, and the rotational speed of said powering device.

9. The apparatus of claim 8 comprising two bulkhead apertures and four shutter windows.

10. The apparatus of claim 9 wherein the powering device rotates the shaft between approximately 300 revolutions per minute and approximately 60,000 revolutions per minute.

11. A method for generating a pulsed pressure induced cavitation effect from a pressurized working fluid to stimulate hydrofracturing of rock in a geothermal reservoir, the method comprising the steps of:

a. positioning into a well casing an apparatus having;

i. an outer housing having a upstream end defining both an inlet aperture and a pressure chamber, the pressure chamber accepting the pressurized working fluid via the inlet aperture, and a downstream end defining a pulse cavity for discharging the pressurized working fluid, and a medial portion defining a stationary bulkhead disposed between the pressure chamber and the pulse cavity and defining one or more bulkhead apertures that fluidly couple the pressure chamber to the pulse cavity;

ii. a rotatable shutter that is disposed inside the pressure chamber and adjacent to the bulkhead, the shutter defining one or more windows and being affixed to a shaft, supported by the bulkhead, and extending through the pressure chamber, the shaft exiting the outer housing through its upstream end; and iii. a powering device coupled to the shaft at its upstream end;

b. pressurizing the pressure chamber with the working fluid using a pump connected to the inlet aperture via a conduit;

c. rotating the shutter with the powering device;

d. discharging the working fluid from the pulse cavity;

e. generating a pressure fluctuation near the liquid and rock interface with the working fluid to induce cavitation on the rock surface; and f. fracturing the rock to create a network of micro-fissures for enhanced heat transfer.

12. The method of claim 11 wherein the working fluid is water.

13. The method of claim 11 wherein the pressurizing step includes pressurizing the working fluid in the pressure chamber to a pressure that is greater than or equal to approximately 300 psi (2068.4 kPa) and less than or equal to approximately 2,000 psi (13789.5kPa) with the pump.

14. The method of claim 11 wherein the period between pulses of the pressurized working fluid in the discharging step is determined by the number of shutter windows, and the rotational speed of said powering device.

15. The method of claim 14 wherein the apparatus includes two bulkhead apertures and four shutter windows.

16. The method of claim 15 wherein the apparatus powering device rotates the shaft between 300 revolutions per minute and 60,000 revolutions per minute.

* * * * *